US012411511B2

(12) United States Patent
Zhu et al.

(10) Patent No.: US 12,411,511 B2
(45) Date of Patent: Sep. 9, 2025

(54) LOW DROPOUT REGULATOR AND ELECTRONIC DEVICE

(71) Applicant: Shanghai Awinic Technology Co., Ltd., Shanghai (CN)

(72) Inventors: Zhipeng Zhu, Shanghai (CN); Chao Yang, Shanghai (CN)

(73) Assignee: Shanghai Awinic Technology Co., Ltd., Shanghai (CN)

( * ) Notice: Subject to any disclaimer, the term of this patent is extended or adjusted under 35 U.S.C. 154(b) by 243 days.

(21) Appl. No.: 18/252,934

(22) PCT Filed: Nov. 17, 2021

(86) PCT No.: PCT/CN2021/131207
§ 371 (c)(1),
(2) Date: May 15, 2023

(87) PCT Pub. No.: WO2022/105796
PCT Pub. Date: May 27, 2022

(65) Prior Publication Data

US 2023/0418320 A1 Dec. 28, 2023

(30) Foreign Application Priority Data

Nov. 18, 2020 (CN) ......................... 202011296347.7

(51) Int. Cl.
*G05F 1/575* (2006.01)
*G05F 1/618* (2006.01)

(52) U.S. Cl.
CPC .................................... *G05F 1/575* (2013.01)

(58) Field of Classification Search
CPC ................................. G05F 1/575; G05F 1/618
See application file for complete search history.

(56) References Cited

U.S. PATENT DOCUMENTS 8,080,982 B2 12/2011 Lin et al.
2010/0026252 A1* 2/2010 Lin .......................... G05F 1/56 323/275

(Continued)

FOREIGN PATENT DOCUMENTS

CN 101398694 A 4/2009
CN 101661301 A 3/2010

(Continued)

OTHER PUBLICATIONS

International search report for PCT/CN2021/131207, issued on Jan. 28, 2022.

(Continued)

*Primary Examiner* — Sisay G Tiku
(74) *Attorney, Agent, or Firm* — Emerson, Thomson & Bennett, LLC; Roger D. Emerson; Seth J. Niemi

(57) ABSTRACT

Provided are a low dropout regulator and an electronic device. The low dropout regulator comprises a control unit electrically connected to a second capacitor, the control unit being used for controlling the connection or disconnection between a first electrode plate of the second capacitor and a second end of a power tube. Therefore, when the low dropout regulator is in a standby state, the control unit controls the disconnection between the first electrode plate of the second capacitor and the second end of the power tube, such that the second end of the power tube has a relatively small connection capacitance, so as to ensure the separation of a dominant pole point at a control end of the power tube from a secondary pole point at the second end of the power tube, and thus, the low dropout regulator has a high loop stability when same is in the standby state, thereby improving the performance of the low dropout regulator.

16 Claims, 5 Drawing Sheets

(56) References Cited

U.S. PATENT DOCUMENTS

| | | | | |
|---|---|---|---|---|
| 2017/0364110 | A1 | 12/2017 | Golara et al. | |
| 2020/0028435 | A1* | 1/2020 | Kim ........................ | H03F 1/025 |
| 2020/0073420 | A1 | 3/2020 | Singh | |
| 2023/0288947 | A1* | 9/2023 | Wang ...................... | G05F 1/575 |

FOREIGN PATENT DOCUMENTS

| | | | | |
|---|---|---|---|---|
| CN | 201011492 | A | | 3/2010 |
| CN | 102769433 | A | | 11/2012 |
| CN | 106708153 | A | | 5/2017 |
| CN | 107924206 | A | | 4/2018 |
| CN | 110187733 | A | | 8/2019 |
| CN | 111427407 | A | | 7/2020 |
| CN | 112327987 | A | | 2/2021 |
| CN | 114637362 | A | * | 6/2022 |
| EP | 3425475 | A1 | | 1/2019 |
| EP | 3599710 | A1 | | 1/2020 |

OTHER PUBLICATIONS

European Search report of patent family EP21893943.7 issued on Mar. 21, 2024.

* cited by examiner

LOW DROPOUT REGULATOR AND ELECTRONIC DEVICE

This application claims the priority to Chinese Patent Application No. 202011296347.7, titled "LOW DROPOUT REGULATOR AND ELECTRONIC DEVICE", filed on Nov. 18, 2020 with the China National Intellectual Property Administration, which is incorporated herein by reference in its entirety.

TECHNICAL FIELD

The present disclosure relates to the technical field of power management, and in particular, to a low dropout regulator and an electronic device.

BACKGROUND

A low dropout regulator (LDO) is an important class of circuits in the field of power management. The LDO has advantages of low output noise, low cost, simple structure and low power consumption, and thus is widely used in electronic systems. With the increasing demand for power supply in many portable electronic systems, the research on high-performance LDO has become a hotspot in the field of power management.

SUMMARY

In view of this, a low dropout regulator and an electronic device are provided according to the present disclosure, to effectively solve the technical problem in the conventional technology. The loop stability of the low dropout regulator according to the present disclosure in a standby state is high, thus the performance of the low dropout regulator is improved.

In order to achieve the above objectives, the following technical solutions are provided according to the present disclosure.

A low dropout regulator includes an operational amplifier, a power transistor, a compensation capacitor, a resistance feedback unit, a control unit, a first capacitor and a second capacitor; where an inverting terminal of the operational amplifier is connected to a reference voltage, a non-inverting terminal of the operational amplifier is electrically connected to an output terminal of the resistance feedback unit, and an output terminal of the operational amplifier is electrically connected to a first electrode plate of the compensation capacitor and a control terminal of the power transistor;

a first terminal of the power transistor is connected to a power supply voltage, a second terminal of the power transistor is electrically connected to an input terminal of the resistance feedback unit, a second electrode plate of the compensation capacitor, a first electrode plate of the first capacitor and the control unit, and a second electrode plate of the first capacitor is electrically connected to a grounding terminal; and the control unit is electrically connected to a first electrode plate of the second capacitor, a second electrode plate of the second capacitor is electrically connected to the grounding terminal, and the control unit is configured to control the first electrode plate of the second capacitor to be connected to the second terminal of the power transistor, or to be disconnected from the second terminal of the power transistor.

In an embodiment, a capacitance of the second capacitor is greater than a capacitance of the first capacitor.

In an embodiment, the control unit includes at least one main switching transistor and a main control module, a gate of the main switching transistor is electrically connected to the main control module, a first terminal of the main switching transistor is electrically connected to a second terminal of the power transistor, and a second terminal of the main switching transistor is electrically connected to the first electrode plate of the second capacitor.

In an embodiment, the control unit may include a plurality of main switching transistors, the plurality of main switching transistors are respectively a first main switching transistor to an N-th main switching transistor, a width-to-length ratio of the first main switching transistor is less than a width-to-length ratio of each of the other main switching transistors in the plurality of main switching transistors, and N represents an integer equal to or greater than 2; and the main control module is configured to control the first main switching transistor to the N-th main switching transistor to be successively turned on.

In an embodiment, a width-to-length ratio of an (i+1)-th main switching transistor is greater than a width-to-length ratio of an i-th main switching transistor, and i represents an integer equal to or greater than 1 and less than or equal to N−1.

In an embodiment, the control unit further includes at least one auxiliary switching transistor, at least one current source and an auxiliary control module, the auxiliary switching transistor and the current source are in one-to-one correspondence, a gate of the auxiliary switching transistor is electrically connected to the auxiliary control module, a first terminal of the auxiliary switching transistor is electrically connected to the second terminal of the power transistor, a second terminal of the auxiliary switching transistor is electrically connected to one terminal of the current source, and the other terminal of the current source is connected to the grounding terminal; and the auxiliary control module is configured to control at least one auxiliary switching transistor to be turned on when the main switching transistor is turned on controlled by the main control module.

In an embodiment, the number of the auxiliary switching transistor is the same as the number of the main switching transistor, and the auxiliary control module is configured to, when the main switching transistor is turned on controlled by the main control module, control the same number of the auxiliary switching transistor as the number of the main switching transistor to be turned on.

In an embodiment, the control unit may include a plurality of main switching transistors and the plurality of main switching transistors are respectively the first main switching transistor to the N-th main switching transistor, the control unit further includes a plurality of auxiliary switching transistors, and the plurality of auxiliary switching transistors are respectively a first auxiliary switching transistor to an N-th auxiliary switching transistor; and the auxiliary control module is configured to control a j-th auxiliary switching transistor to be turned on when a j-th main switching transistor is turned on controlled by the main control module, and j represents an integer equal to or greater than 1 and less than or equal to N.

In an embodiment, a current of a current source electrically connected to the first auxiliary switching transistor is less than a current of each of the other current sources.

In an embodiment, a current of a current source electrically connected to the N-th auxiliary switching transistor is greater than a current of each of the other current sources.

An electronic device is further provided according to the present disclosure, the electronic device includes any one of the low dropout regulators described above.

Compared with the conventional technology, the technical solutions according to the present disclosure have the following advantages.

A low dropout regulator and an electronic device are provided according to the present disclosure. The low dropout regulator includes an operational amplifier, a power transistor, a compensation capacitor, a resistance feedback unit, a control unit, a first capacitor and a second capacitor. An inverting terminal of the operational amplifier is connected to a reference voltage, a non-inverting terminal of the operational amplifier is electrically connected to an output terminal of the resistance feedback unit, and an output terminal of the operational amplifier is electrically connected to a first electrode plate of the compensation capacitor and a control terminal of the power transistor. A first terminal of the power transistor is connected to a power supply voltage, a second terminal of the power transistor is electrically connected to an input terminal of the resistance feedback unit, a second electrode plate of the compensation capacitor, a first electrode plate of the first capacitor and the control unit, and a second electrode plate of the first capacitor is electrically connected to a grounding terminal. The control unit is electrically connected to a first electrode plate of the second capacitor, and a second electrode plate of the second capacitor is electrically connected to the grounding terminal. The control unit is configured to control the first electrode plate of the second capacitor to be connected to the second terminal of the power transistor, or to be disconnected from the second terminal of the power transistor.

It can be seen from the above descriptions that the low dropout regulator according to the present disclosure includes a control unit electrically connected to the second capacitor, and the control unit is configured to control the first electrode plate of the second capacitor to be connected to the second terminal of the power transistor, or to be disconnected from the second terminal of the power transistor. Therefore, when the low dropout regulator is in the standby state, the control unit controls the first electrode plate of the second capacitor to be disconnected from the second terminal of the power transistor. Thus, the second terminal of the power transistor is connected to a small capacitor, and a primary pole at the control terminal of the power transistor is ensured to be separated from a secondary pole at the second terminal of the power transistor, so that the low dropout regulator has high loop stability in the standby state, improving the performance of the low dropout regulator.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

As described in the background technology, a low dropout regulator (LDO) is an important class of circuits in the field of power management. The LDO has advantages of low output noise, low cost, simple structure and low power consumption, and thus is widely used in electronic systems. With the increasing demand for power supply in many portable electronic systems, the research on high-performance LDO has become a hotspot in the field of power management.

Based on this, a low dropout regulator and an electronic device are provided according to embodiments of the present disclosure, to effectively solves the technical problem in the conventional technology. The low dropout regulator according to the embodiment of the present disclosure has high loop stability in a standby state, thus the performance of the low dropout regulator is improved.

In order to achieve the above objectives, the following technical solutions are provided according to the embodiments of the present disclosure. The technical solutions according to the embodiments of the present disclosure are described in detail in conjunction with FIGS. 1 to 5.

Figure 1:
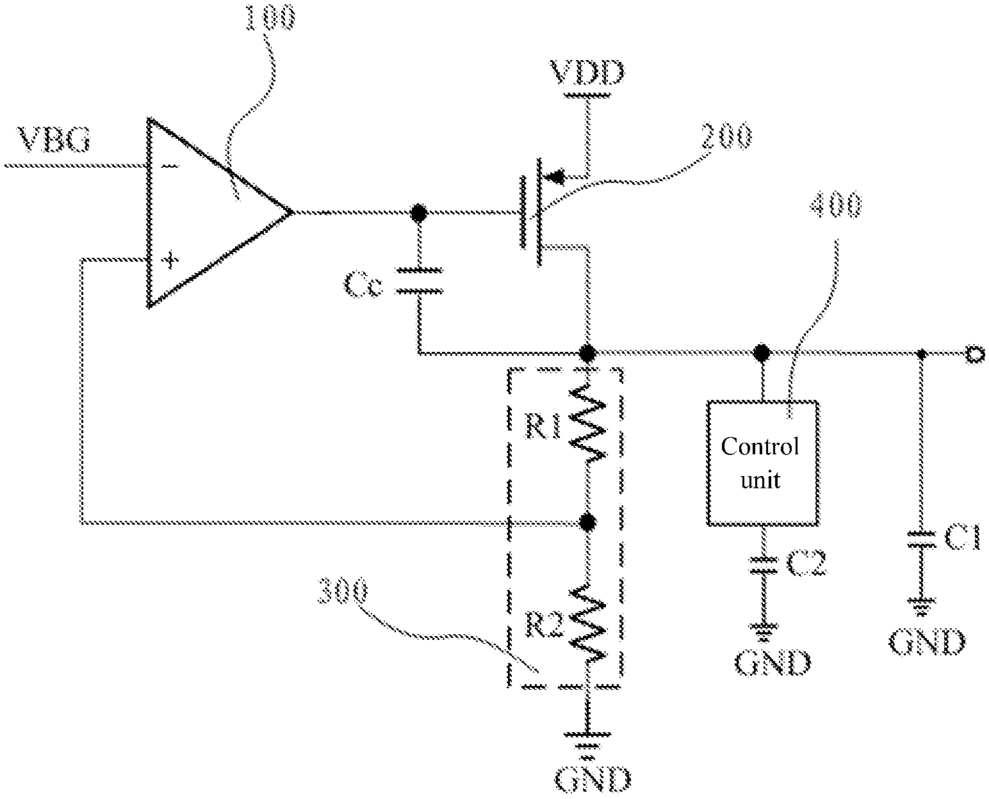
FIG. 1 is a schematic structural diagram of a low dropout regulator according to an embodiment of the present disclosure.

Reference is made to FIG. 1, which is a schematic structural diagram of a low dropout regulator according to an embodiment of the present disclosure. The low dropout regulator includes an operational amplifier 100, a power transistor 200, a compensation capacitor Cc, a resistance feedback unit 300, a control unit 400, a first capacitor C1 and a second capacitor C2.

An inverting terminal of the operational amplifier 100 is connected to a reference voltage VBG, a non-inverting terminal of the operational amplifier 100 is electrically connected to an output terminal of the resistance feedback unit 300, and an output terminal of the operational amplifier 100 is electrically connected to a first electrode plate of the compensation capacitor Cc and a control terminal of the power transistor 200, such as a gate.

A first terminal of the power transistor 200 is connected to a power supply voltage VDD, a second terminal of the power transistor 200 is electrically connected to an input terminal of the resistance feedback unit 300, a second electrode plate of the compensation capacitor Cc, a first electrode plate of the first capacitor C1 and the control unit 400, and a second electrode plate of the first capacitor C1 is electrically connected to a grounding terminal GND.

The control unit 400 is electrically connected to a first electrode plate of the second capacitor C2, and a second electrode plate of the second capacitor C2 is electrically connected to the grounding terminal GND. The control unit 400 is configured to control the first electrode plate of the second capacitor C2 to be connected to the second terminal of the power transistor 200, or to be disconnected from the second terminal of the power transistor 200.

In an embodiment, the resistance feedback unit 300 according to the embodiment of the present disclosure includes a first resistor R1 and a second resistor R2 that are connected in series with each other. The first resistor R1 and the second resistor R2 form a voltage-dividing circuit. A first terminal of the first resistor R1 is connected to the second terminal (that is, an output terminal of the low dropout regulator) of the power transistor 200, a second terminal of the second resistor R2 is connected to the grounding terminal GND, and a second terminal of the first resistor R1 and a first terminal of the second resistor R2 are connected to the non-inverting terminal of the operational amplifier 100.

The resistance feedback unit according to the embodiment of the present disclosure is configured to acquire a voltage outputted by the power transistor, and then transmit the voltage outputted by the power transistor to the operational amplifier. The operational amplifier is configured to control the power transistor based on the reference voltage and a voltage outputted by the resistance feedback unit. The compensation capacitor according to the embodiment of the present disclosure is configured to perform Miller compensation to further improve the loop stability.

It can be understood that, the low dropout regulator according to the embodiment of the present disclosure includes the control unit electrically connected to the second capacitor, and the control unit is configured to control the first electrode plate of the second capacitor to be connected to the second terminal of the power transistor, or to be disconnected from the second terminal of the power transistor. Therefore, when the low dropout regulator is in the standby state, the control unit controls the first electrode plate of the second capacitor to be disconnected from the second terminal of the power transistor. Thus, the second terminal of the power transistor is connected to a small capacitor, that is, only connected to the first capacitor, and a primary pole at the control terminal of the power transistor is ensured to be separated from a secondary pole at the second terminal of the power transistor, so that the low dropout regulator has high loop stability in the standby state, improving the performance of the low dropout regulator.

In an embodiment of the present disclosure, a capacitance of the second capacitor according to the present disclosure is greater than a capacitance of the first capacitor, so that the second terminal of the power transistor is connected to a small capacitor when the low dropout regulator is in the standby state, further improving the loop stability of the low dropout regulator in the standby state.

Figure 2:
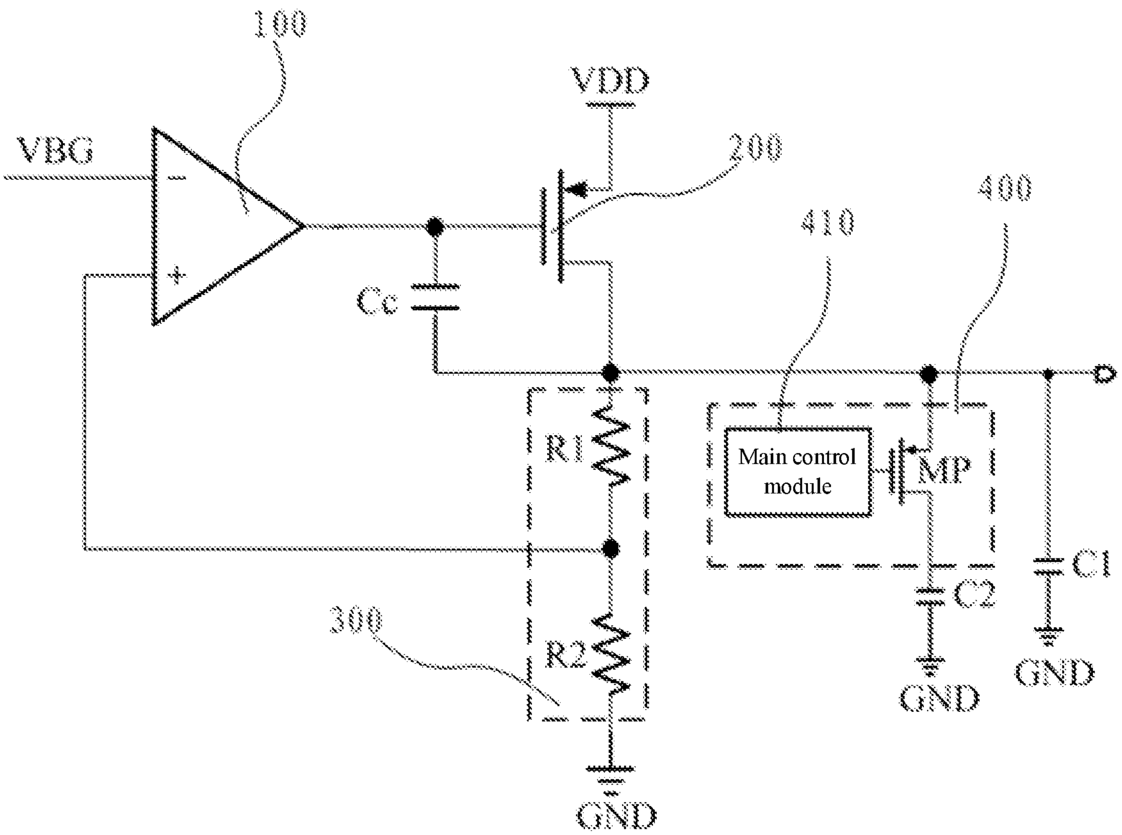
FIG. 2 is a schematic structural diagram of a low dropout regulator according to another embodiment of the present disclosure.

Reference is made to FIG. 2, which is a schematic structural diagram of a low dropout regulator according to another embodiment of the present disclosure. The control unit 400 according to the embodiment of the present disclosure includes at least one main switching transistor MP and a main control module 410. A gate of the main switching transistor MP is electrically connected to the main control module 410, a first terminal of the main switching transistor MP is electrically connected to a second terminal of the power transistor 200, and a second terminal of the main switching transistor MP is electrically connected to the first electrode plate of the second capacitor C2.

It can be understood that, the control unit according to the embodiment of the present disclosure is configured to control the second terminal of the power transistor to be connected to the first electrode plate of the second capacitor, or to be disconnected from the first electrode plate of the second capacitor. The control unit may include at least one main switching transistor and the main control module. The main control module provides a turn-on signal or a turn-off signal for the main switching transistor to control the main switching transistor to be turned on or off, so as to control the second terminal of the power transistor to be connected to the first electrode plate of the second capacitor, or to be disconnected from the first electrode plate of the second capacitor.

According to the embodiment of the present disclosure, the control unit may include a plurality of main switching transistors and the low dropout regulator is in an operating state, the main control module may control the plurality of main switching transistors to be successively turned on, thereby avoiding a large voltage drop at the second terminal of the power transistor caused by large charges in a capacitor connected to the second terminal of the power transistor being instantaneously released due to the connection of the second capacitor.

Figure 3:
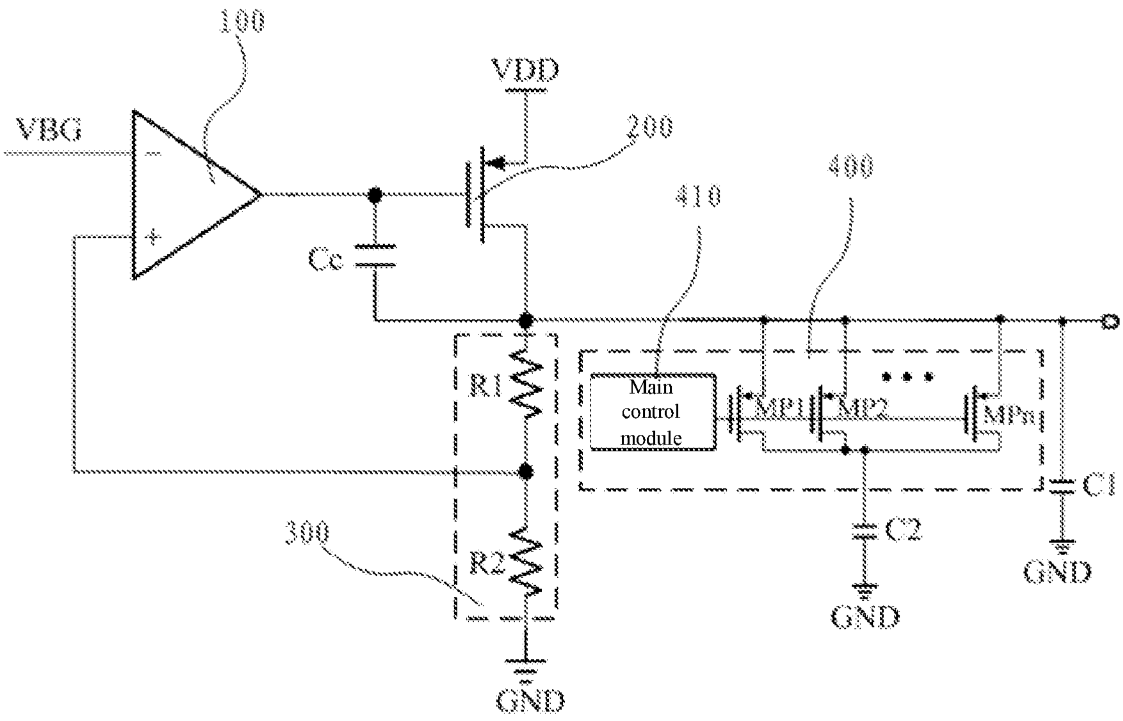
FIG. 3 is a schematic structural diagram of a low dropout regulator according to another embodiment of the present disclosure.

Reference is made to FIG. 3, which is a schematic structural diagram of a low dropout regulator according to another embodiment of the present disclosure. The control unit 400 includes plurality of main switching transistors, and the plurality of main switching transistors are respectively a first main switching transistor MP1 to an N-th main switching transistor MPn. A width-to-length ratio of the first main switching transistor MP1 is less than a width-to-length ratio of each of the other main switching transistors in the plurality of main switching transistors. N represents an integer equal to or greater than 2. The main control module 410 is configured to control the first main switching transistor MP1 to the N-th main switching transistor MPn to be successively turned on when the first electrode plate of the second capacitor C2 is connected to the second terminal of the power transistor 200 controlled by the control unit 400.

It should be noted that, according to the embodiment of the present disclosure, there is a predetermined time interval between a time instant when a previous main switching transistor is turned on controlled by the main control module and a time instant when a next main switching transistor is turned on controlled by the main control module. A value of the predetermined time interval is not limited in the present disclosure, which is required to be calculated and analyzed according to the actual application.

It can be understood that, when the low dropout regulator according to the embodiment of the present disclosure is in the operating state, the main control module controls the first main switching transistor to the N-th main switching transistor to be successively turned on, and the width-to-length ratio of the first main switching transistor is less than the width-to-length ratio of each of the other main switching transistors in the plurality of main switching transistors. Since the first main switching transistor has the small width-to-length ratio and large conduction resistance, a transfer speed of charges in the capacitor connected to the second terminal of the power transistor is limited when the first main switching transistor is controlled to be turned on, so as to avoid a large voltage drop at the second terminal of the power transistor. The second main switching transistor to the N-th main switching transistor with a small width-to-length ratio are successively controlled to be turned on, so as to complete the process that the first electrode plate of the second capacitor is connected to the second terminal of the power transistor, so that a voltage fluctuation at the second terminal of the power transistor can be reduced by successively controlling the first main switching transistor to the N-th main switching transistor to be turned on. In addition, the main control module may control all main switching transistors to be simultaneously turned off when the low dropout regulator according to the embodiment of the present disclosure is in the standby state or the operating state, which is not limited in the present disclosure.

Further, a width-to-length ratio of an (i+1)-th main switching transistor according to the embodiment of the present disclosure is greater than a width-to-length ratio of an i-th main switching transistor, and i represents an integer equal to or greater than 1 and less than or equal to N−1, so that total conduction resistance of the plurality of main switching transistors that are parallel to each other can be reduced, and the voltage drop at the second terminal of the power transistor is small during the connection of the second capacitor.

Figure 4:
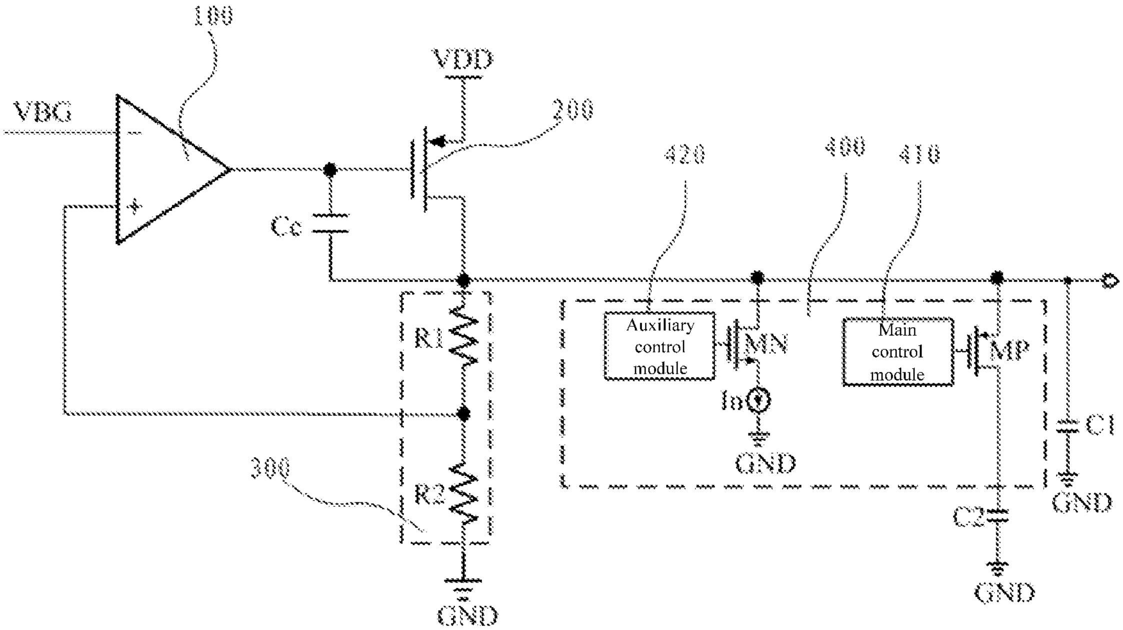
FIG. 4 is a schematic structural diagram of a low dropout regulator according to another embodiment of the present disclosure.

Reference is made to FIG. 4, which is a schematic structural diagram of a low dropout regulator according to another embodiment of the present disclosure. The control unit 400 according to the embodiment of the present disclosure further includes at least one auxiliary switching transistor MN, at least one current source In and an auxiliary control module 420. The auxiliary switching transistor MN and the current source are in one-to-one correspondence. A gate of the auxiliary switching transistor MN is electrically connected to the auxiliary control module 420, a first terminal of the auxiliary switching transistor MN is electrically connected to the second terminal of the power transistor 200, a second terminal of the auxiliary switching transistor MN is electrically connected to one terminal of the current source In, and the other terminal of the current source In is connected to the grounding terminal GND. The auxiliary control module 420 is configured to control at least one auxiliary switching transistor MN to be turned on when the main switching transistor MP is turned on controlled by the main control module 410. In an embodiment, the main control module 410 and the auxiliary control module 420 may be one module.

It can be understood that the control unit according to the embodiment of the present disclosure further includes the auxiliary switching transistor, the current source and the auxiliary control module. When the low dropout regulator is in the operating state and the main switching transistor is turned on controlled by the main control module, the auxiliary control module controls the auxiliary switching transistor to be turned on, so that the current source is connected to the second terminal of the power transistor. The current source is equivalent to a fixed load, and the current source is connected to the second terminal of the power transistor, so that the primary pole at the control terminal of the power transistor is ensured to be separated from the secondary pole at the second terminal of the power transistor, further improving the loop stability of the low dropout regulator in the standby state, and improving the performance of the low dropout regulator. In addition, when the low dropout regulator according to the embodiment of the present disclosure is in the standby state or the operating state, the auxiliary control module may control all auxiliary switching transistors to be simultaneously turned off, which is not limited in the present disclosure.

Figure 5:
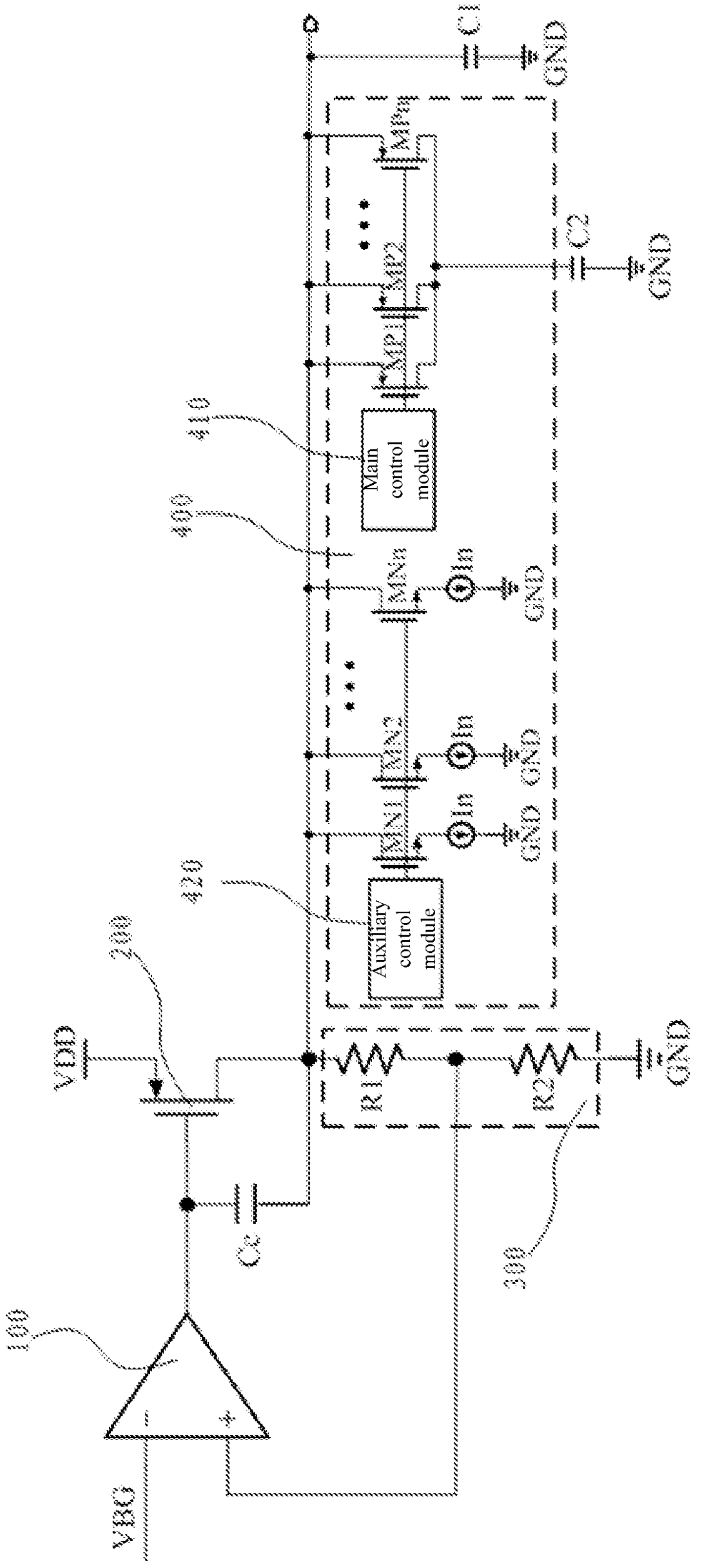
FIG. 5 is a schematic structural diagram of a low dropout regulator according to another embodiment of the present disclosure.

According to the embodiment of the present disclosure, the number of the auxiliary switching transistor is the same as the number of the main switching transistor, and the auxiliary control module is configured to control the same number of the auxiliary switching transistor as the main switching transistor to be turned on when the main switching transistor is turned on controlled by the main control module. Reference is made specifically to FIG. 5 which is a schematic structural diagram of a low dropout regulator additionally with auxiliary switching transistors, current sources and the auxiliary control module compared with the low dropout regulator shown in FIG. 3. According to the embodiment of the present disclosure, when the control unit includes a plurality of main switching transistors and the plurality of main switching transistors are respectively the first main switching transistor MP1 to the N-th main switching transistor MPn, the control unit 400 further includes a plurality of auxiliary switching transistors, and the plurality of auxiliary switching transistors are respectively a first auxiliary switching transistor MN1 to an N-th auxiliary switching transistor MNn. The auxiliary control module 420 is configured to control a j-th auxiliary switching transistor to be turned on when a j-th main switching transistor is turned on controlled by the main control module 410, and j represents an integer equal to or greater than 1 and less than or equal to N.

It can be understood that, when the low dropout regulator according to the embodiment of the present disclosure is in the operating state, when the j-th main switching transistor is turned on controlled by the main control module, the auxiliary control module controls the j-th auxiliary switching transistor to be turned on, to connect the current source electrically connected to the j-th auxiliary switching transistor to the first electrode plate of the first capacitor, so that an auxiliary switching transistor is controlled to be turned on when a main switching transistor is controlled to be turned on. Therefore, the degree of the switching transistor connected to the second capacitor is synchronized with the number of the connected current sources, so as to further avoid a large voltage fluctuation at the second terminal of the power transistor, so that the primary pole at the control terminal of the power transistor is ensured to be separated from the secondary pole at the second terminal of the power transistor, further improving the loop stability of the low dropout regulator in the standby state, and improving the performance of the low dropout regulator.

In an embodiment of the present disclosure, a current of the current source electrically connected to the first auxiliary switching transistor according to the present disclosure is less than a current of each of the other current sources, thereby limiting a transfer speed of charges from the capacitor connected to the second terminal of the power transistor to the current source electrically connected to the first auxiliary switching transistor, so as to ensure high loop stability. Moreover, a current of a current source electrically connected to the N-th auxiliary switching transistor according to the present disclosure is greater than a current of each of the other current sources, so that currents of the current sources connected to different auxiliary switching transistor are designed to be different from each other, to ensure that a total current of all current sources meets an expected current and the loop stability is high.

It should be noted that according to the embodiment of the present disclosure, the power transistor may be a P-type transistor, the main switching transistor may be a P-type transistor, and the auxiliary switching transistor may be an N-type transistor. A type of the power transistor, a type of the main switching transistor, and a type of the auxiliary switching transistor are not limited in the present disclosure.

In an embodiment of the present disclosure, the operational amplifier according to the present disclosure may be OTA (operational transconductance amplifier), which is not limited in the present disclosure.

Accordingly, an electronic device is further provided according to the embodiment of the present disclosure. The electronic device includes the low dropout regulator according to any one of the embodiments described above.

In an embodiment of the present disclosure, the electronic device according to the present disclosure may be an optical anti-shake lens, and the like. A type of the electronic device is not limited in the present disclosure.

A low dropout regulator and an electronic device are provided according to the embodiments of the present disclosure. The low dropout regulator includes an operational amplifier, a power transistor, a compensation capacitor, a resistance feedback unit, a control unit, a first capacitor and a second capacitor. An inverting terminal of the operational amplifier is connected to a reference voltage, a non-inverting terminal of the operational amplifier is electrically connected to an output terminal of the resistance feedback unit, and an output terminal of the operational amplifier is electrically connected to a first electrode plate of the compensation capacitor and a control terminal of the power transistor. A first terminal of the power transistor is connected to a power supply voltage, a second terminal of the power transistor is electrically connected to an input terminal of the resistance feedback unit, a second electrode plate of the compensation capacitor, a first electrode plate of the first capacitor and the control unit, and a second electrode plate of the first capacitor is electrically connected to a grounding terminal. The control unit is electrically connected to a first electrode plate of the second capacitor, and a second electrode plate of the second capacitor is electrically connected to the grounding terminal. The control unit is configured to control the first electrode plate of the second capacitor to be connected to the second terminal of the power transistor, or to be disconnected from the second terminal of the power transistor.

It can be seen from the above descriptions that the low dropout regulator according to the embodiment of the present disclosure includes the control unit electrically connected to the second capacitor, the control unit is configured to control the first electrode plate of the second capacitor to be connected to the first electrode plate of the first capacitor, or to be disconnected from the first electrode plate of the first capacitor. Therefore, when the low dropout regulator is in the standby state, the control unit controls the first electrode plate of the second capacitor to be disconnected from the second terminal of the power transistor, the second terminal of the power transistor is connected to a small capacitor, that is, only connected to the first capacitor, and a primary pole at the control terminal of the power transistor is separated from a secondary pole at the second terminal of the power transistor, so that the low dropout regulator has high loop stability in the standby state, improving the performance of the low dropout regulator.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, and should be defined by the widest scope consistent with the principle and novel features disclosed herein.

The invention claimed is:

1. A low dropout regulator, comprising: an operational amplifier, a power transistor, a compensation capacitor, a resistance feedback unit, a control unit, a first capacitor and a second capacitor, wherein an inverting terminal of the operational amplifier is connected to a reference voltage, a non-inverting terminal of the operational amplifier is electrically connected to an output terminal of the resistance feedback unit, and an output terminal of the operational amplifier is electrically connected to a first electrode plate of the compensation capacitor and a control terminal of the power transistor;

a first terminal of the power transistor is connected to a power supply voltage, a second terminal of the power transistor is electrically connected to an input terminal of the resistance feedback unit, a second electrode plate of the compensation capacitor, a first electrode plate of the first capacitor and the control unit, and a second electrode plate of the first capacitor is electrically connected to a grounding terminal; and the control unit is electrically connected to a first electrode plate of the second capacitor, a second electrode plate of the second capacitor is electrically connected to the grounding terminal, and the control unit is configured to control the first electrode plate of the second capacitor to be connected to the second terminal of the power transistor, or to be disconnected from the second terminal of the power transistor;

wherein the control unit comprises at least one main switching transistor and a main control module, a gate of each of the at least one main switching transistor is electrically connected to the main control module, a first terminal of each of the at least one main switching transistor is electrically connected to the second terminal of the power transistor, and a second terminal of each of the at least one main switching transistor is electrically connected to the first electrode plate of the second capacitor.

2. The low dropout regulator according to claim 1, wherein a capacitance of the second capacitor is greater than a capacitance of the first capacitor.

3. The low dropout regulator according to claim 1, wherein the control unit comprises a plurality of main switching transistors, the plurality of main switching transistors are respectively a first main switching transistor to an N-th main switching transistor, a width-to-length ratio of the first main switching transistor is less than a width-to-length ratio of every other one in the plurality of main switching transistors, and Nis an integer equal to or greater than 2; and the main control module is configured to control the first main switching transistor to the N-th main switching transistor to be successively turned on.

4. The low dropout regulator according to claim 3, wherein a width-to-length ratio of an (i+1)-th main switching transistor is greater than a width-to-length ratio of an i-th main switching transistor, and i is an integer equal to or greater than 1 and less than or equal to N−1.

5. The low dropout regulator according to claim 1, wherein the control unit further comprises at least one auxiliary switching transistor, at least one current source and an auxiliary control module, one of the at least one auxiliary switching transistor and one of the at least one current source are in one-to-one correspondence, a gate of each of the at least one auxiliary switching transistor is electrically connected to the auxiliary control module, a first terminal of each of the at least one auxiliary switching transistor is electrically connected to the second terminal of the power transistor, a second terminal of each of the at least one auxiliary switching transistor is electrically connected to one terminal of each of the at least one current source, and the other terminal of each of the at least one current source is connected to the grounding terminal; and the auxiliary control module is configured to control the at least one auxiliary switching transistor to be turned on when each of the at least one main switching transistor is turned on controlled by the main control module.

6. The low dropout regulator according to claim 5, wherein a number of the at least one auxiliary switching transistor is the same as a number of the at least one main switching transistor, and the auxiliary control module is configured to, when the at least one main switching transistor is controlled by the main control module to be turned on, control the same number of the at least one auxiliary switching transistor as the number of the at least one main switching transistor to be turned on.

7. The low dropout regulator according to claim 6, wherein the control unit comprises a plurality of main switching transistors and the plurality of main switching transistors are respectively a first main switching transistor to an N-th main switching transistor, the control unit further comprises a plurality of auxiliary switching transistors, and the plurality of auxiliary switching transistors are respectively a first auxiliary switching transistor to an N-th auxiliary switching transistor; and the auxiliary control module is configured to control a j-th auxiliary switching transistor to be turned on when a j-th main switching transistor is controlled by the main control module to be turned on, wherein N is an integer equal to or greater than 2 and j is an integer equal to or greater than 1 and less than or equal to N.

8. The low dropout regulator according to claim 7, wherein a current of one of the at least one current source electrically connected to the first auxiliary switching transistor is less than a current of every other one of the at least one current source.

9. The low dropout regulator according to claim 8, wherein a current of one of the at least one current source electrically connected to the N-th auxiliary switching transistor is greater than a current of every other one of the at least one current source.

10. An electronic device, comprising a low dropout regulator, the low dropout regulator comprising: an operational amplifier, a power transistor, a compensation capacitor, a resistance feedback unit, a control unit, a first capacitor and a second capacitor, wherein an inverting terminal of the operational amplifier is connected to a reference voltage, a non-inverting terminal of the operational amplifier is electrically connected to an output terminal of the resistance feedback unit, and an output terminal of the operational amplifier is electrically connected to a first electrode plate of the compensation capacitor and a control terminal of the power transistor;

a first terminal of the power transistor is connected to a power supply voltage, a second terminal of the power transistor is electrically connected to an input terminal of the resistance feedback unit, a second electrode plate of the compensation capacitor, a first electrode plate of the first capacitor and the control unit, and a second electrode plate of the first capacitor is electrically connected to a grounding terminal; and the control unit is electrically connected to a first electrode plate of the second capacitor, a second electrode plate of the second capacitor is electrically connected to the grounding terminal, and the control unit is configured to control the first electrode plate of the second capacitor to be connected to the second terminal of the power transistor, or to be disconnected from the second terminal of the power transistor;

wherein the control unit comprises at least one main switching transistor and a main control module, a gate of each of the at least one main switching transistor is electrically connected to the main control module, a first terminal of each of the at least one main switching transistor is electrically connected to the second terminal of the power transistor, and a second terminal of each of the at least one main switching transistor is electrically connected to the first electrode plate of the second capacitor.

11. The electronic device according to claim 10, wherein a capacitance of the second capacitor is greater than a capacitance of the first capacitor.

12. The electronic device according to claim 10, wherein the control unit comprises a plurality of main switching transistors, the plurality of main switching transistors are respectively a first main switching transistor to an N-th main switching transistor, a width-to-length ratio of the first main switching transistor is less than a width-to-length ratio of each of the other main switching transistors in the plurality of main switching transistors, and N is an integer equal to or greater than 2; and the main control module is configured to control the first main switching transistor to the N-th main switching transistor to be successively turned on.

13. The electronic device according to claim 12, wherein a width-to-length ratio of the (i+1)-th main switching transistor is greater than a width-to-length ratio of the i-th main switching transistor, and i is an integer equal to or greater than 1 and less than or equal to N−1.

14. The electronic device according to claim 10, wherein the control unit further comprises at least one auxiliary switching transistor, at least one current source and an auxiliary control module, one of the at least one auxiliary switching transistor and one of the at least one current source are in one-to-one correspondence, a gate of each of the at least one auxiliary switching transistor is electrically connected to the auxiliary control module, a first terminal of each of the at least one auxiliary switching transistor is electrically connected to the second terminal of the power transistor, a second terminal of each of the at least one auxiliary switching transistor is electrically connected to one terminal of each of the at least one current source, and the other terminal of each of the at least one current source is connected to the grounding terminal; and the auxiliary control module is configured to control the at least one auxiliary switching transistor to be turned on when the at least one main switching transistor is controlled by the main control module to be turned on.

15. The electronic device according to claim 14, wherein a number of the at least one auxiliary switching transistor is the same as a number of the at least one main switching transistor, and the at least one auxiliary control module is configured to, when the at least one main switching transistor is controlled by the main control module to be turned on, control the same number of the at least one auxiliary switching transistor as the number of the at least one main switching transistor to be turned on.

16. The electronic device according to claim 15, wherein the control unit further comprises a plurality of auxiliary switching transistors, and the plurality of auxiliary switching transistors are respectively a first auxiliary switching transistor to an N-th auxiliary switching transistor; and the auxiliary control module is configured to control a j-th auxiliary switching transistor to be turned on when a j-th main switching transistor is controlled by the main control module to be turned on, wherein N is an integer equal to or greater than 2, and j is an integer equal to or greater than 1 and less than or equal to N.

* * * * *